United States Patent Office 3,579,448
Patented May 18, 1971

3,579,448
GREASE COMPOSITION
Alvin Harrison, Irvington, N.Y., assignor to Stauffer Chemical Company, New York, N.Y.
No Drawing. Filed June 25, 1968, Ser. No. 739,634
Int. Cl. C10m 7/26, 7/24
U.S. Cl. 252—28
5 Claims

ABSTRACT OF THE DISCLOSURE

A grease composition consisting of a synthetic ester thickened to a grease-like composition with bentonite clay, wherein a pyrogenic silica gelling agent is added thereto.

BACKGROUND OF THE INVENTION

In the art of manufacturing grease compositions, it has been the practice to thicken mineral base oils or synthetic diesters derived from dicarboxylic acids and monohydric alcohols to a grease-like consistency. The mineral base oils are fluid materials that are derived from petroleum products in a well known manner. The mineral base oils are thickened to a grease-like consistency with a complex of bentonite clay with an aliphatic or aromatic amine salt. Such complexes may be obtained by reacting an amine, for instance alkyl or mixed alkyl/aryl quaternary ammonium salts, with an acid such as hydrochloric or acetic acid, to form the amine salt which is then added to a water dispersion of bentonite clay. The complex formed is then washed free of excess salt, dried and ground to a powder. Such bentonite amine complexes are commercially available. The method employed for preparing the grease is to form a slurry of the bentonite complex with the mineral base oil, and to add a small portion to the slurry of an oxygen or nitrogen containing polar material, including acetone or acetone derivatives, alcohols, propylene, carbonate, acetonitrile or phenothiazine. The resulting gel-like mixture is then homogenized, for instance in a colloid mill, when a stable grease structure is formed with approximately 5 to 10% of a bentonite complex, based on the total composition.

The synthetic diesters employed as base stock oils are derived from dicarboxylic acids and monohydric alcohols or from dihydric alcohols and monocarboxylic acids. Suitable thickening agents for such diesters include conventional soap thickeners, inorganic thickening agents including amorphous silica and carbon black. It has been found in the art that if a bentonite amine complex is used as the grease thickening agent for the diester base oils, the resulting greases are unexpectedly deficient in lubricating properties under elevated temperatures. Greases of this general class are described in U.S. Pat. Nos. 2,626,241; 2,662,059; 3,134,736 and British Pat. No. 1,023,379.

BRIEF DESCRIPTION OF THE INVENTION

It has been discovered that a lubricating grease composition with exceptional lubricating properties can be manufactured employing a trifunctional ester or tetrafunctional ester as the base fluid. These base fluids can be thickened with a bentonite clay composition along with other secondary gelling agents and dispersing agents.

DETAILED DESCRIPTION OF THE INVENTION

In the practice of the present invention, a synthetic trifunctional ester or tetrafunctional ester is first manufactured by reacting a tri or tetrafunctional alcohol with an organic acid. The trifunctional ester can be manufactured by reacting trimethylol propane, trimethylol ethane or glycerol with an organic acid selected from the group consisting of trimellitic acid, heptanoic acid, valeric acid, pelargonic acid, or other organic acids having from 4 to 18 carbon atoms. The reaction product will be a trifunctional polyester resin composition that can be thickened into a grease composition. The multifunctional polyester resin can be manufactured by reacting pentaerythritol, dipentaerythritol and mixtures thereof with an organic acid selected from the group consisting of trimellitic acid, heptanoic acid, valeric acid, pelargonic acid, or other organic acids having from 4 to 18 carbon atoms. The resulting tetrafunctional polyester resin can also be thickened into a grease composition. In the alternative, a trifunctional organic acid such as octric acid, also known as 1,3,5, tricarboxypentane, can be reacted with a monofunctional alcohol such as 2-ethylhexyl alcohol, n-heptyl alcohol, or other aliphatic alcohols having from 4 to 18 carbon atoms.

After the trifunctional or tetrafunctional esters have been formed, they are admixed with a bentonite amine complex to produce a grease-like consistency in a manner that is well known in the art. The bentonite amine complexes function as the primary gelling material and are stirred into the synthetic trifunctional or tetrafunctional base oils at elevated temperatures and thereafter milled to a homogeneous colloidal system.

If desired, dispersing agents can be incorporated therein which function to disperse the clay throughout the matrix of the base oils. Thereafter, secondary gelling agents such as lithium stearate, asbestos or a colloidal pyrogenic silica pigment can be incorporated therein. It has been found in practice that the trifunctional or tetrafunctional ester compositions base fluids require the presence of the pyrogenic silica secondary gelling agents in addition to the primary gelling agents of clay. Thus, the pyrogenic silica gelling agent should be present in an amount ranging between 0.1 to 3.0% by weight with from about 3 to 8% weight bentonite clay.

The lubricating compositions have exceptional shear stability, corrosive resistance and load carrying properties at both high and low temperatures. In addition to the above properties, the lubricating compositions of the present invention when combined with the pyrogenic silica pigment require substantially less amount of the clay material to provide the requisite composition having the grease-like properties.

The following examples illustrate the merits of the present invention.

EXAMPLE 1

Three different grease formulations were admixed together and studied for oxidative thermal stability. The first composition consisted of 90.9 parts by weight of trimethylol propane triheptanoate, 1.0 part by weight phenyl-α-naphthyl amine, 5.6 parts by weight bentonite clay, 1.0 part by weight pyrogenic silica gelling agent and 1.5 parts by weight propylene carbonate. The second grease formulation had a base stock consisting of 91.0 parts by weight pentaerythritol monobutyrate triheptanoate cross-linked with azelaic acid to a viscosity of 5.6 to 6.0 centistokes measured at 210° F., 6.5 parts by weight bentonite clay, 1.0 part by weight pyrogenic silica gelling agent and 1.5 parts by weight propylene carbonate. The third grease formulation was provided with 88.4 parts by weight pentaerythritol monobutyrate triheptanoate cross-linked with azelaic acid to a viscosity of 5.6 to 6.0 centistokes measured at 210° F., 2.5 parts by weight phenyl-α-naphthyl amine, 6.6 parts by weight bentonite clay, 1.0 part by weight pyrogenic silica gelling agent, and 1.5 parts by weight propylene carbonate. Each of the above grease compositions were tested in accordance with ASTM methods to provide the following results:

TABLE I

| | | | |
|---|---|---|---|
| Dropping point | 575 | 600 | 640 |
| Evaporation (22 hours): | | | |
| 210° F | 1.34 | | |
| 350° F | | 3.8 | 3.4 |
| Separation: | | | |
| 212° F | 2.65 | | |
| 350° F | | 4.30 | 4.36 |
| Oxidation stability, 100 hrs | 0 | 0 | 0 |
| Thin film test: | | | |
| 300° F | Pass | | |
| 350° F | | Pass | |
| 400° F | | | Pass |

EXAMPLE 2

Several different grease formulations were made and the rust resistance thereof was studied. Thus, stainless steel panels were coated on one side with the greases and suspended in a beaker containing sufficient water to completely cover the grease. The beaker was placed in an oven at a temperature of 100° F. for 48 hours. At the end of the test period, the panel was removed from the beaker, wiped clean of grease and examined for evidence of rusting and pitting. The rusting is classified as none, slight, moderate and extreme. The grease formulations and results of the rust resistance tests are indicated on the following table.

TABLE II

| | A | B | C | D | E | F |
|---|---|---|---|---|---|---|
| Trimethylol propane triheptanoate | 87.0 | 92.0 | 90.1 | 86.5 | 89.0 | 89.0 |
| Bentonite clay | 13.0 | 5.7 | 5.6 | 12.5 | 3.75 | 5.0 |
| Pyrogenic silica gelling agent | | 1.0 | 1.0 | | 1.0 | 1.0 |
| Bentonite clay with sodium nitrite in the matrix | | | | | 3.75 | 2.5 |
| Propylene carbonate | | 1.5 | 1.5 | 1.5 | 1.5 | 1.5 |
| Phenyl-α-naphthyl amine | | 1.0 | 1.0 | 1.0 | 1.0 | 1.0 |
| Amount of rusting | E | S | S | E | N | N |

EXAMPLE 3

The shear stability of several different grease formulations were studied. Thus, the penetration of each of the formulations was conducted in a conventional manner. The grease formulations and the results of the tests are indicated below:

TABLE III

| | A | B | C | D | E | F | G |
|---|---|---|---|---|---|---|---|
| Trimethylol propane triheptanoate | 91.5 | | 87.0 | 92.0 | 90.9 | 86.5 | 91.7 |
| Pentaerythritol monobutyrate triheptanoate cross-linked with azelaic acid to a viscosity of 5.6–6.0 centistokes measured at 210° F | | 91.5 | | | | | |
| Bentonite clay | 7.0 | 8.0 | 13.0 | 5.7 | 5.6 | 12.5 | |
| Pyrogenic silica gelling agent | | | | 1.0 | 1.0 | | 8.3 |
| Propylene carbonate | 1.5 | 1.5 | | 1.5 | 1.5 | | |
| Phenyl-α-naphthyl amine | | | | 1.0 | 1.0 | | |
| Penetration, strokes: | | | | | | | |
| 0 | 272 | 279 | 237 | 259 | 267 | 261 | 310 |
| 60 | 276 | 304 | 261 | 262 | 269 | 270 | |
| 10,000 | 337 | 387 | 285 | 315 | 330 | 332 | |
| 100,000 | 400 | 420 | 300 | 356 | 365 | 367 | |

EXAMPLE 4

The extreme pressure of the greases was tested by formulating two greases and testing the same in accordance with standard procedures. The greases and results of the tests are set out below:

TABLE IV

| | A | B |
|---|---|---|
| Trimethylol propane triheptanoate | 90.9 | 96.5 |
| Bentonite clay | 5.6 | 12.5 |
| Pyrogenic silica gelling agent | 1.0 | |
| Propylene carbonate | 1.5 | |
| Phenyl-α-naphthyl amine | 1.0 | 1.0 |
| Falex load test, lbs | 2,000 | 2,150 |

The standard Falex load test was carried out on five commercially available greases to compare with the greases of Example IV. The highest test load was well under 1800 lbs.

What is claimed is:
1. A grease composition comprising:
   (a) a liquid synthetic ester selected from the group consisting of trifunctional polyester resins and tetrafunctional polyester resins;
   (b) a bentonite clay, said clay being present in an amount sufficient to thicken the liquid synthetic ester to a grease consistency; and
   (c) from about 0.1 to about 3 percent by weight of the entire composition of pyrogenic silica gelling agent.

2. The grease composition as set forth in claim 1 wherein said synthetic ester can be derived by reacting a trifunctional alcohol selected from the group consisting of trimethylol propane, trimethylol ethane, glycerol and mixtures thereof with an organic acid selected from the group consisting of aliphatic monocarboxylic acids and benzene tricarboxylic acids having from 4 to 18 carbon atoms.

3. The grease composition of matter set forth in claim 1 wherein said synthetic ester can be derived by reacting a tetrafunctional alcohol selected from the group consisting of pentaerythritol, di-pentaerythritol and mixtures thereof with an organic acid selected from the group consisting of aliphatic monocarboxylic acids and benzene tricarboxylic acids having from 4 to 18 carbon atoms.

4. The grease composition set forth in claim 1 wherein said synthetic ester can be derived by reacting 1, 3, 5, tricarboxypentane with a monofunctional aliphatic alcohol having from 4 to 18 carbon atoms.

5. The grease composition as set forth in claim 1, wherein said bentonite clay is present in an amount ranging between 3 and 8% by weight.

References Cited

UNITED STATES PATENTS

| | | | |
|---|---|---|---|
| 2,662,059 | 12/1953 | McCarthy | 252—56 |
| 2,939,840 | 6/1960 | Fronczak | 252—28 |
| 3,134,736 | 5/1964 | Sarrof et al. | 252—28 |
| 3,347,791 | 10/1967 | Thompson et al. | 252—50 |
| 3,389,124 | 6/1968 | Sparks | 252—50 |

FOREIGN PATENTS

| | | | |
|---|---|---|---|
| 1,023,379 | 3/1966 | Great Britain | 252—28 |

DANIEL E. WYMAN, Primary Examiner

I. VAUGHN, Assistant Examiner

U.S. Cl. X.R.

252—56, 387